United States Patent
Dal Mutto et al.

(10) Patent No.: US 9,380,263 B2
(45) Date of Patent: Jun. 28, 2016

(54) SYSTEMS AND METHODS FOR REAL-TIME VIEW-SYNTHESIS IN A MULTI-CAMERA SETUP

(71) Applicant: AQUIFI, INC., Palo Alto, CA (US)

(72) Inventors: Carlo Dal Mutto, Mountain View, CA (US); Abbas Rafii, Palo Alto, CA (US)

(73) Assignee: Aquifi, Inc., Palo Alto, CA (US)

(*) Notice: Subject to any disclaimer, the term of this patent is extended or adjusted under 35 U.S.C. 154(b) by 0 days.

(21) Appl. No.: 14/588,796

(22) Filed: Jan. 2, 2015

(65) Prior Publication Data
US 2015/0195443 A1 Jul. 9, 2015

Related U.S. Application Data

(60) Provisional application No. 61/964,370, filed on Jan. 3, 2014.

(51) Int. Cl.

| | |
|---|---|
| H04N 7/14 | (2006.01) |
| H04N 5/262 | (2006.01) |
| H04N 13/02 | (2006.01) |
| H04N 7/15 | (2006.01) |
| G06T 7/00 | (2006.01) |

(52) U.S. Cl.
CPC ............ *H04N 7/144* (2013.01); *G06T 7/0075* (2013.01); *H04N 5/2628* (2013.01); *H04N 7/15* (2013.01); *H04N 13/0239* (2013.01); *G06T 2200/08* (2013.01); *G06T 2207/10012* (2013.01)

(58) Field of Classification Search
CPC ......... H04N 7/14; H04N 7/141; H04N 7/144; H04N 7/15; G06T 15/00; G06T 15/04; G06T 15/20; G06T 15/205
USPC ................. 348/14.01, 14.16, 42, 43, 46, 47, 348/211.11, 239, 333.01
See application file for complete search history.

(56) References Cited

U.S. PATENT DOCUMENTS

| 5,359,362 | A | * | 10/1994 | Lewis | ................... | H04N 7/142 348/14.1 |
|---|---|---|---|---|---|---|
| 6,208,373 | B1 | * | 3/2001 | Fong | .................... | H04N 7/144 348/14.03 |
| 6,771,303 | B2 | * | 8/2004 | Zhang | ................... | H04N 7/144 348/14.08 |
| 6,977,743 | B2 | * | 12/2005 | Carlton | ..................... | 358/1.15 |
| 8,299,979 | B2 | * | 10/2012 | Rambo | ................. | H04N 7/144 345/1.1 |
| 2005/0129325 | A1 | * | 6/2005 | Wu | ............................ | 382/254 |
| 2008/0158340 | A1 | * | 7/2008 | Shibata et al. | ............. | 348/14.16 |
| 2010/0002102 | A1 | * | 1/2010 | Carpio | ................... | G06F 3/005 348/241 |
| 2010/0225735 | A1 | * | 9/2010 | Shaffer et al. | .............. | 348/14.08 |

\* cited by examiner

*Primary Examiner* — Lin Ye
*Assistant Examiner* — Chriss Yoder, III
(74) *Attorney, Agent, or Firm* — Lewis Roca Rothgerber Christie LLP

(57) ABSTRACT

A video transmitting system includes: a display configured to display an image in a first direction; cameras including: a first camera adjacent a first edge of the display; and a second camera adjacent a second edge of the display, at least a portion of the display being proximal a convex hull that includes the first camera and the second camera, the first camera and the second camera having substantially overlapping fields of view encompassing the first direction; and an image processor to: receive a position of a virtual camera relative to the cameras substantially within the convex hull and substantially on the display, the virtual camera having a field of view encompassing the first direction; receive raw images captured by the cameras at substantially the same time; and generate processed image data from the raw images for synthesizing a view in accordance with the position of the virtual camera.

15 Claims, 11 Drawing Sheets

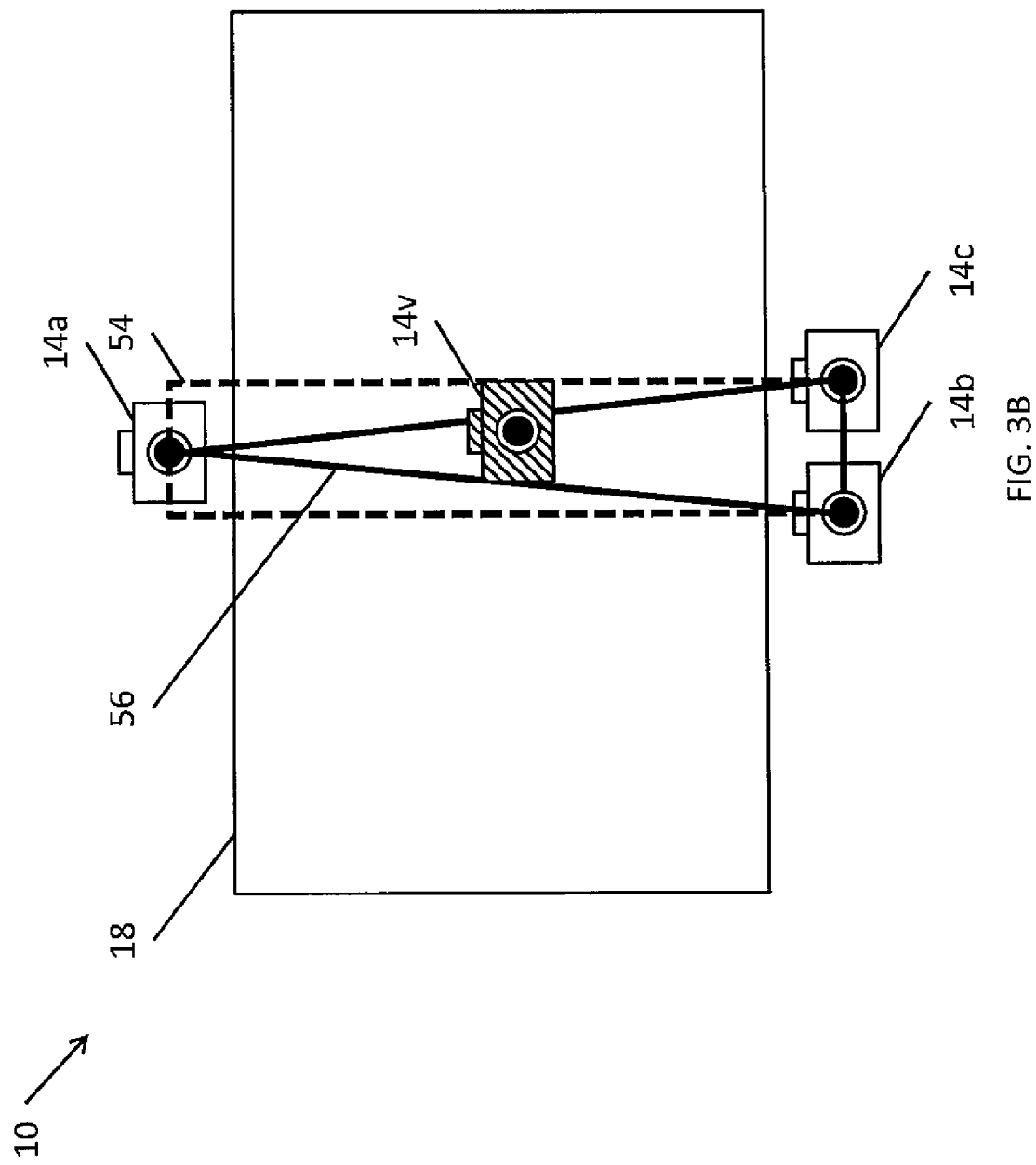

SYSTEMS AND METHODS FOR REAL-TIME VIEW-SYNTHESIS IN A MULTI-CAMERA SETUP

CROSS-REFERENCE TO RELATED APPLICATION(S)

This application claims the benefit of U.S. Provisional Patent Application No. 61/964,370, titled "Systems and Methods for Real-Time View-Synthesis in a Multi-Camera Setup," filed in the United States Patent and Trademark Office on Jan. 3, 2014, the entire disclosure of which is incorporated herein by reference.

BACKGROUND

In a traditional camera, whether analog or digital, an optical system focuses light onto a single image plane. A single image is formed by recording (e.g., with film or a digital sensor) the intensity of the received light on that image plane.

Computational imaging techniques apply image processing to multiple captured images (sequentially, substantially simultaneously, or combinations thereof) in order to synthesize images that can be significantly different from the originally captured images.

Computing devices and communication devices such as laptop computers, tablet computers, and smartphones often include one or more integrated cameras or can be connected to external cameras. These cameras are commonly used for video conferencing or live broadcast over a network such as a local area network or the Internet, as well as for recording videos to be stored and transmitted for later viewing.

SUMMARY

Embodiments of the present invention are directed to systems and methods for synthesizing views in a multi-camera setup in real-time. Embodiments of the present invention may also be configured to record and process multi-camera for later synthesizing a view. The position of the synthesized view may correspond to a location different from any of the cameras of the multi-camera setup and may be located in a portion of the device in which it would be difficult or impossible to place a real camera. For example, with cameras located on upper and lower edges of the display panel of the device, the synthesized view may simulate the perspective from a virtual camera located within the display panel.

According to one embodiment of the present invention, a video transmitting system includes: a display configured to display an image in a first direction; a plurality of cameras including: a first camera adjacent a first edge of the display; and a second camera adjacent a second edge of the display, at least a portion of the display being proximal a convex hull that includes the first camera and the second camera, the first camera and the second camera having substantially overlapping fields of view encompassing the first direction; and an image processor configured to: receive a position of a virtual camera relative to the cameras substantially within the convex hull and substantially on the display, the virtual camera having a field of view encompassing the first direction; receive a plurality of raw images captured by the cameras at substantially the same time; generate processed image data from the raw images for synthesizing a view in accordance with the position of the virtual camera; and transmit the processed image data to a receiving system.

The cameras may further include a third camera facing in the first direction having a field of view substantially overlapping at the field of view of at least one of the first camera and second camera, wherein the convex hull further includes the third camera, and wherein the position of the virtual camera is substantially within the convex hull.

The image processor may be configured to process the raw images by: warping each of the raw images to the position of the virtual camera to generate a plurality of warped images; and combining pixels of the warped images to generate the processed image data.

The processed image data may include a depth map, and wherein the image processor may be further configured to compute a depth map relative to the position of the virtual camera based on the plurality of raw images.

The image processor may be further configured to apply a filter to the processed image data.

The image processor may be configured to process the raw images by: computing a depth map from the plurality of raw images; generating a three-dimensional model from the depth map; and applying the raw images as textures onto the three-dimensional model.

The position of the virtual camera may be a location of the display in which a portion of an image of a face is displayed or is a computed location of an eye gaze.

According to one embodiment of the present invention, a method for generating a view-synthesized image in a video processing system, the video processing system including: a display configured to display an image in a first direction; a plurality of cameras including a first camera adjacent a first edge of the display and a second camera adjacent a second edge of the display, at least a portion of the display being proximal a convex hull that includes the first camera and the second camera, the first camera and the second camera having substantially overlapping fields of view encompassing the first direction; and an image processor, the method including: capturing a plurality of raw images by the cameras, the raw images being captured at substantially the same time; receiving, by the image processor, a position of a virtual camera relative to the cameras substantially within the convex hull and substantially on the display, the virtual camera having a field of view encompassing the first direction; generating, by the image processor, processed image data from the raw images for synthesizing a view in accordance with the position of the virtual camera; and transmitting the processed image data to a receiving system.

The cameras may further include a third camera facing in the first direction having a field of view substantially overlapping at the field of view of at least one of the first camera and second camera, wherein the convex hull further includes the third camera, and wherein the position of the virtual camera is substantially within the convex hull.

The processing the raw images in accordance with the position of the virtual camera may include: warping each of the raw images to the position of the virtual camera to generate a plurality of warped images; and combining pixels of the warped images to generate the processed image data.

The method may further include: computing a depth map relative to the position of the virtual camera based on the plurality of raw images.

The method may further include applying a filter to the processed image data.

The processing the images in accordance with the position of the virtual camera may include: computing a depth map from the plurality of raw images; generating a three-dimensional model from the depth map; and applying the raw images as textures onto the three-dimensional model.

The position of the virtual camera may be a location of the display in which a portion of an image of a face is displayed or is a computed location of an eye gaze.

According to one embodiment of the present invention, a video processing system configured to receive processed image data from a video transmitting system, the video transmitting system including a plurality of cameras and a display, the video processing system may include: an image processor configured to: receive the processed image data from the video transmitting system; receive a position of a virtual camera; and generate a synthesized view from the processed image data and the position of the video camera.

The processed image data may include a plurality of raw images captured at substantially the same time, and the image processor may be configured to generate the synthesized view from the processed image data by: warping each of the raw images to the position of the virtual camera to generate a plurality of warped images; and combining pixels of the warped images to generate the processed image data.

The video processing system may further include a display, and the image processor may be further configured to synthesize a view from the vantage point of the virtual camera from the processed image data and to display the synthesized view on the display.

The video processing system may be a server configured to receive the processed image data from the video transmitting system over a network, and the video processing system may be configured to synthesize a view from the vantage point of the virtual camera from the processed image data and to transmit the synthesized view to a video receiver system over the network.

BRIEF DESCRIPTION OF THE DRAWINGS

The accompanying drawings, together with the specification, illustrate exemplary embodiments of the present invention, and, together with the description, serve to explain the principles of the present invention.

FIG. 3B is a schematic illustration of a virtual camera region according to one embodiment of the present invention.

DETAILED DESCRIPTION

Figure 1:
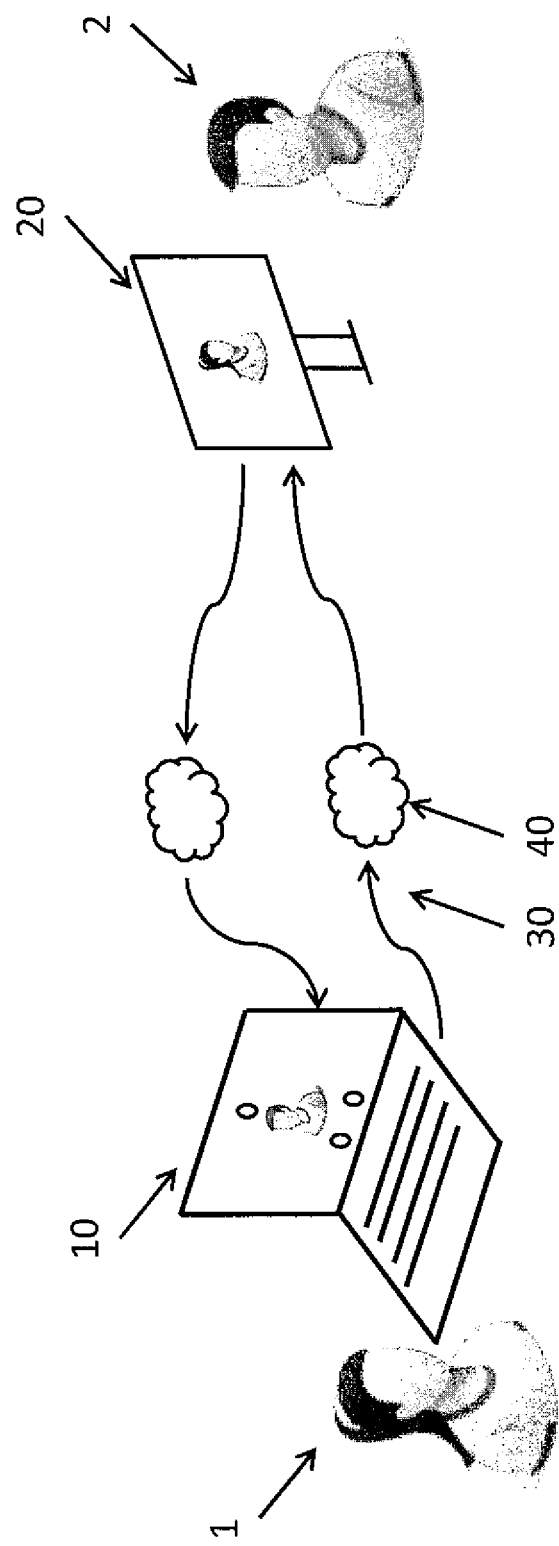
FIG. 1 is a schematic diagram illustrating a system for transmitting, receiving, and displaying view-synthesized images according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Video conferencing systems generally include a single camera located, for example, above or below a display panel. The camera captures images (or video) of a first user and transmits the images to a videoconferencing system of a second user so that the second party can see an image of the first user on his display. Likewise, a camera of the second user's videoconferencing system captures an image of the second user and transmits that image to the first user's system to be shown on the display of her user terminal. During a video conferencing session, the first user may, as natural, look at the image of the second user as shown on her screen. However, because the single camera is generally located either above or below the display, the second user can often get the impression that the first user is not looking at the other's face, because such an effect would require looking directly into the camera lens itself instead of the image on screen. For example, when the cameras are mounted above the display, there is an eye contact problem in which the first user appears to be looking slightly below the second user's eyes.

Aspects of embodiments of the present invention are directed to systems and methods for capturing images using a multi-camera setup and synthesizing views based on the captured images in real-time. The position of the synthesized view may correspond to a location different from any of the cameras of the multi-camera setup and may be located in a portion of the device in which it would be difficult or impossible to place a real camera.

For example, a video conferencing system according to embodiments of the present) invention having cameras located at upper and lower edges of the display panel of the device are capable of, for example, transmitting information capable of simulating the perspective from a virtual camera located in the area of the display panel.

As such, aspects of embodiments of the present invention are directed to reducing or removing the "eye contact problem" by synthesizing views of a first user from the vantage point of a virtual camera corresponding to the location of an image of a second user's face or eyes on the first user's screen. Other aspects of embodiments of the present invention are directed to selecting a location of the virtual camera according to other heuristics, such as for instance, the center of the display. By synthesizing a view from such a perspective, second user perceives that the first user is looking at him during the videoconferencing system when the second user looks at the image of the first user on her display.

In addition, in embodiments of the present invention with cameras placed at both the top and bottom of the display, the system is able to cope with vertical occlusions. For example, portions of a user's neck, which would be occluded from the vantage point of a camera placed above the screen, can be imaged from the camera at the bottom of the display and used in the synthesized view. Similarly, the camera at the top of the screen can image upper portions of the head, which the forehead would occlude from the view of the camera at the bottom of the display.

More generally, aspects of embodiments of the present invention are directed to systems and methods for synthesizing views in a multi-camera system.

FIG. 1 is a schematic diagram of a video conferencing system for transmitting, receiving, and displaying view-synthesized images according to one embodiment of the present invention. As seen in FIG. 1, a first user 1 at a first user terminal 10 is engaged in a video conference with a second user 2 at second user terminal 20 over a network connection 30. The first user terminal 10 includes multiple cameras arranged on different sides (e.g., at upper and lower sides) of a display. The multiple cameras have multiple, overlapping fields of view and capture images of first user 1 from multiple angles, thereby allowing subsequent synthesis of a view from the vantage point of a virtual camera located in a position different from any of the (physical) cameras. The first user terminal 10 may include a display that shows an image of user 2.

The first user terminal 10 transmits processed image data to the second user terminal 20 over network 30 and the second user terminal 20 may further process the data received from the first user terminal 10 in order to render the synthesized view on the display of the second user terminal.

In some embodiments of the present invention, a cloud-based processing service 40 is coupled to the network connection 30 and the first user terminal 10 sends image data or processed image data to the second user terminal 20 via the cloud-based processing service 40. The cloud-based processing service 40 may process the data received from the first user terminal 10 before sending processed data to the second user terminal 20. The various components of a video conferencing system according to various embodiments of the present invention will be described in more detail below.

Figure 2A:
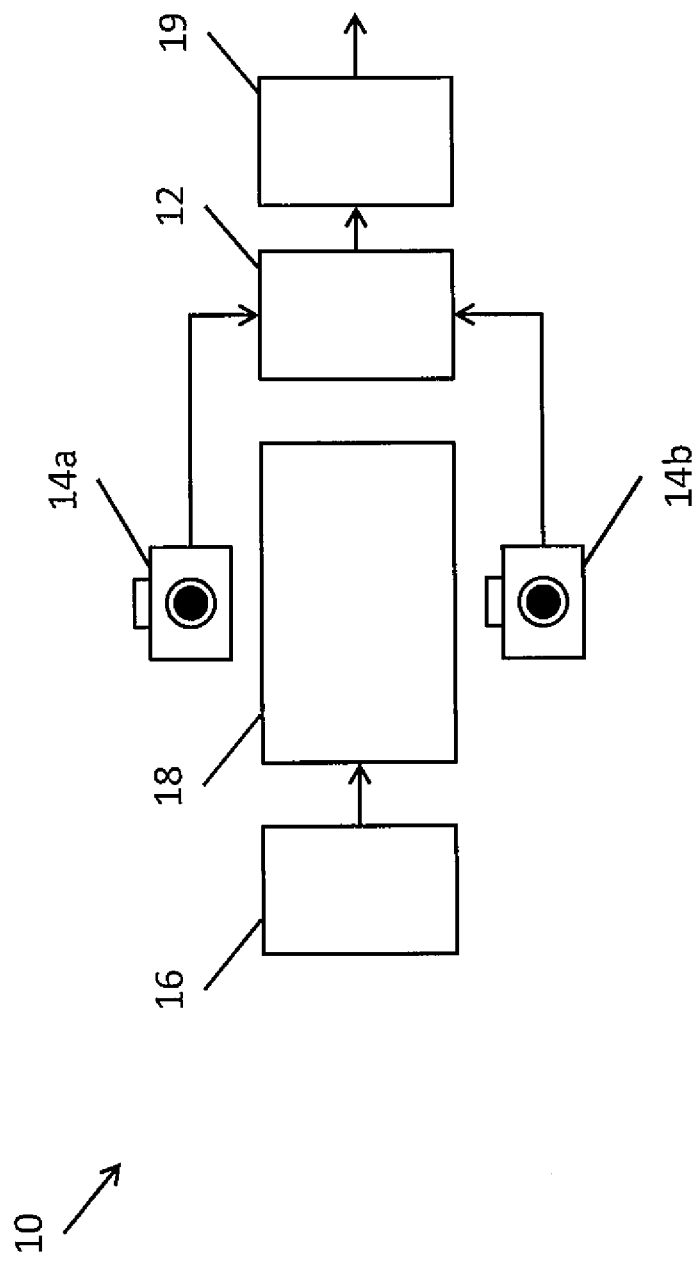
FIG. 2A is a block diagram illustrating a transmitting system according to one embodiment of the present invention.

FIG. 2A is a block diagram illustrating a transmitting system 10 according to one embodiment of the present invention. The transmitting system 10 of one embodiment includes an image processor 12 coupled to multiple cameras 14 (as shown in this embodiment, first camera 14a and second camera 14b), which are located at or adjacent different sides of the display 18 (as shown in this embodiment, upper and lower sides of the display 18). Cameras 14a and 14b supply captured raw images to the image processor 12 for processing. An application processor or graphical processing unit (AP/GPU) 16 may be configured to supply driving signals to show images on display 18. In some embodiments, the AP/GPU 16 may be the same component as the image processor 12 (e.g., a specifically programmed general purpose processor) and may be configured to perform image processing operations. The image processor 12 may be implemented in a variety of forms, such as an application specific integrated processor (ASIC), a field programmable gate array (FPGA), a programmed general purpose processor, and combinations thereof. The image processor 12 and the AP/GPU 16 may be coupled to a communication device 19 such as a network adapter (e.g., a wired Ethernet or wireless WiFi connection) or a universal serial bus (USB) connection. In addition, the various components of the system may be coupled together via any of a number of ways, such as with direct connections or via a system bus.

Figure 2B:
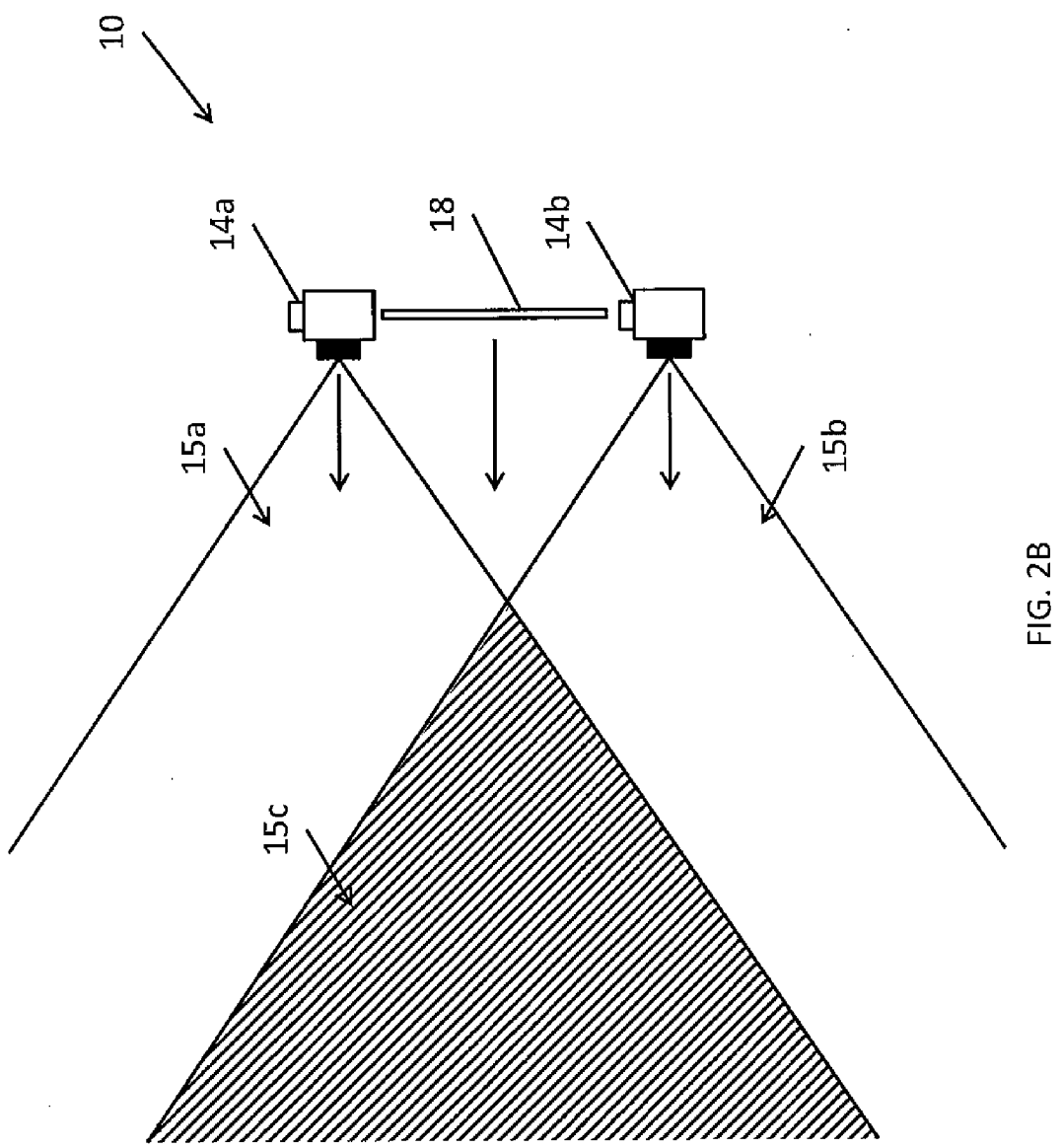
FIG. 2B is a schematic diagram illustrating the overlapping fields of views of cameras according to one embodiment of the present invention.

FIG. 2B is a schematic diagram illustrating the overlapping fields of views of cameras according to one embodiment of the present invention. As shown in FIG. 2B, display 18 is configured to emit light along a first direction (or viewing direction) as indicated by the arrow extending from the display 18. The "first direction" is a predominant direction that is parallel (or substantially parallel) to the central axis of the camera.

Cameras 14a and 14b, located adjacent different edges of display 18, face in substantially the same direction and are configured to have overlapping fields of view 15a and 15b, which overlap in a region 15c, as indicated by the hashed area. The cameras 14 may be arranged on substantially the same vertical line with respect to the display, with the centers of the fields of view extending parallel to one another (e.g., in a direction normal to the display) or may be tilted to various degrees (e.g., camera 14a may be angled slightly downward, toward the display and camera 14b may be angled slightly upward, toward the display).

Figure 2C:
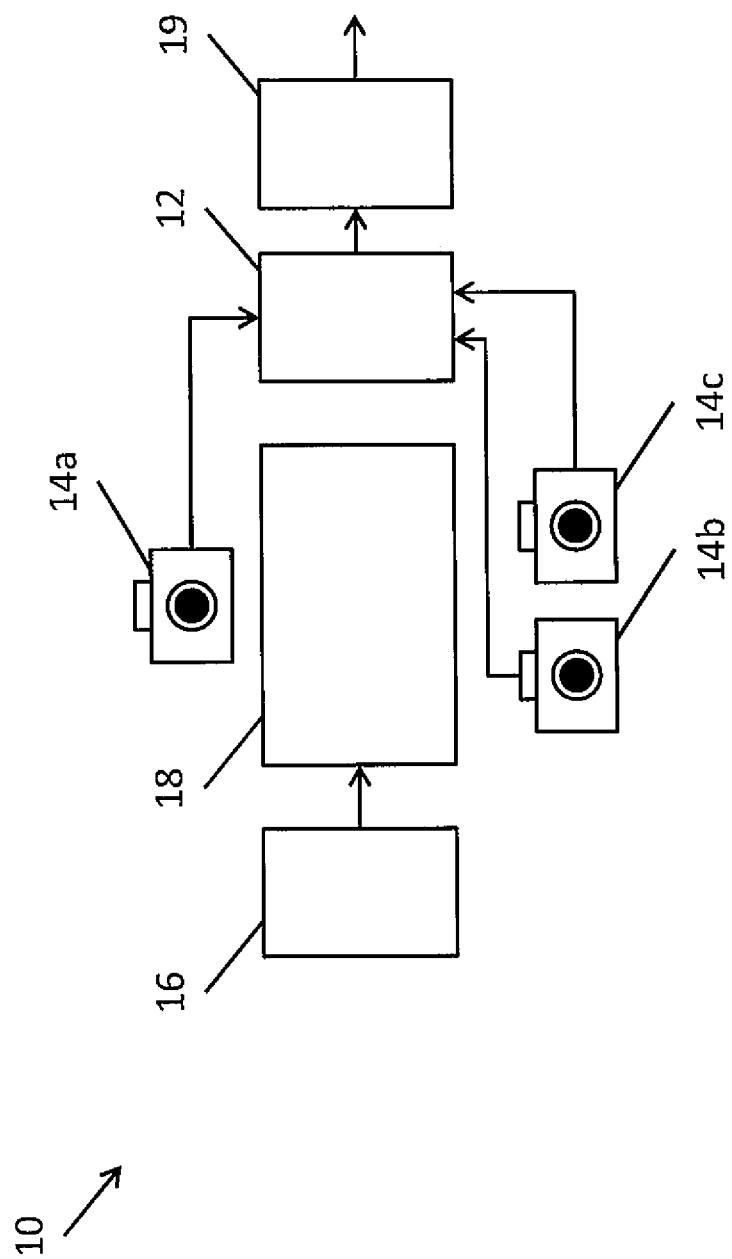
FIG. 2C is a block diagram illustrating a transmitting system according to one embodiment of the present invention.

FIG. 2C is a block diagram illustrating a transmitting system according to one embodiment of the present invention. The transmitting system 10 illustrated in FIG. 2C is substantially similar to that of FIG. 2A, except for the addition of a third camera 14c at or adjacent the lower side of the display 18. The third camera 14c may be spaced apart from second camera 14b by a short distance based on the expected distance to the subject to be framed, in accordance with the intended usage of the device. For example, the distance between the camera can be shorter for smaller devices such as smartphones and personal digital assistants (PDAs) where the user is generally closer to the device. As another example, with laptop computers where users are expected to be slightly farther away, the cameras may be placed farther apart. In one embodiment, the second and third cameras are approximately 65 mm apart. Like the first and second cameras 14a and 14b, the third camera 14c may be coupled to the image processor 12.

Although the transmitting system 10 of FIG. 2C is illustrated as having one camera (14a) at the upper edge of the display 18 and two cameras (14b and 14c) located at a lower side of display 18, embodiments of the present invention are not limited thereto. For example, in some embodiments, there may be two cameras located at the upper edge of the display and one camera located at the lower edge of the display. In still other embodiments, there may be more than three cameras located at various portions of the display (e.g., two cameras adjacent the upper edge of the display and two cameras adjacent the lower edge of the display or a camera at each of the corners of the display).

Figure 2D:
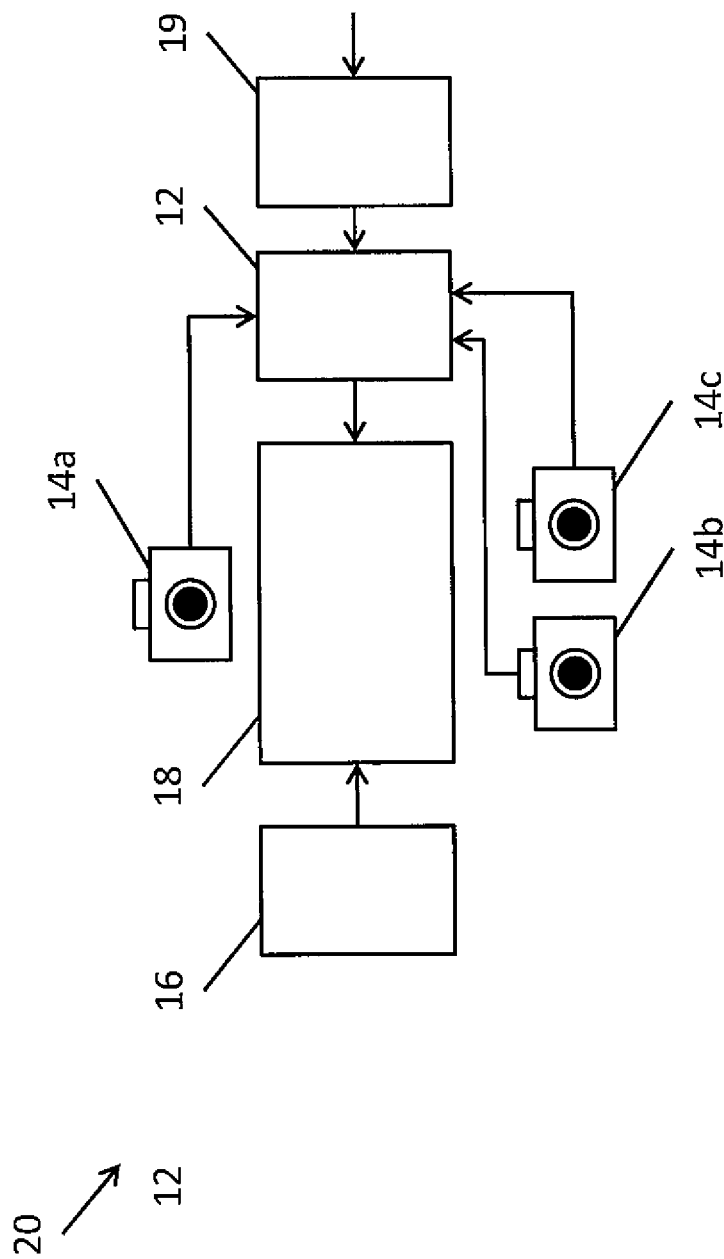
FIG. 2D is a block diagram illustrating a receiving system according to one embodiment of the present invention.

FIG. 2D is a block diagram illustrating a receiving system according to one embodiment of the present invention. A receiving system 20 may be substantially similar to the transmitting system 10, including a display 18 and an application processor 16. The receiving system 20 also includes cameras 14 and an image processor 12 in a manner substantially similar to that of transmitting system 10 such that receiving system 20 may also act as a transmitting system. The image processor 12 of the embodiment of FIG. 2D is shown as being coupled directly to the display 18. Processed image data received from the network 30 via communications device 19 may be supplied to the image processor 12 for processing and then shown on the display 18. In some embodiment of the present invention, the processed data is supplied to the display 18 via the AP/GPU 16.

Figure 2E:
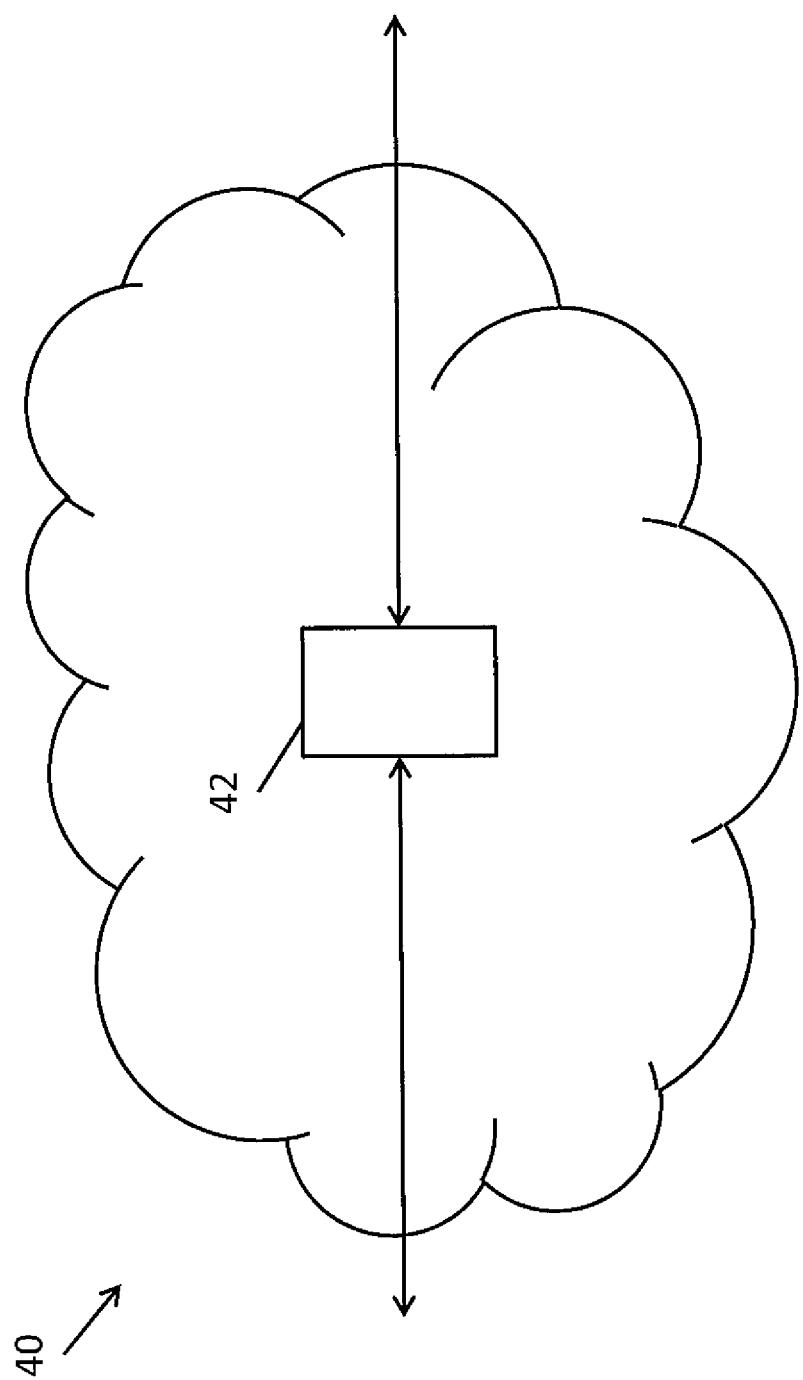
FIG. 2E is a block diagram illustrating an intermediary processing system according to one embodiment of the present invention.

FIG. 2E is a block diagram illustrating an intermediary processing system according to one embodiment of the present invention. In some embodiments of the present invention, one or more image processing operations are performed by a cloud-based processing service 40. The cloud-based processing service 40 may include a cloud-based image processor 42, which is configured to receive image data from a transmitting system 10, process the received image data, and transmit the processed image data to a receiving system 20 over network 30.

Figure 3A:
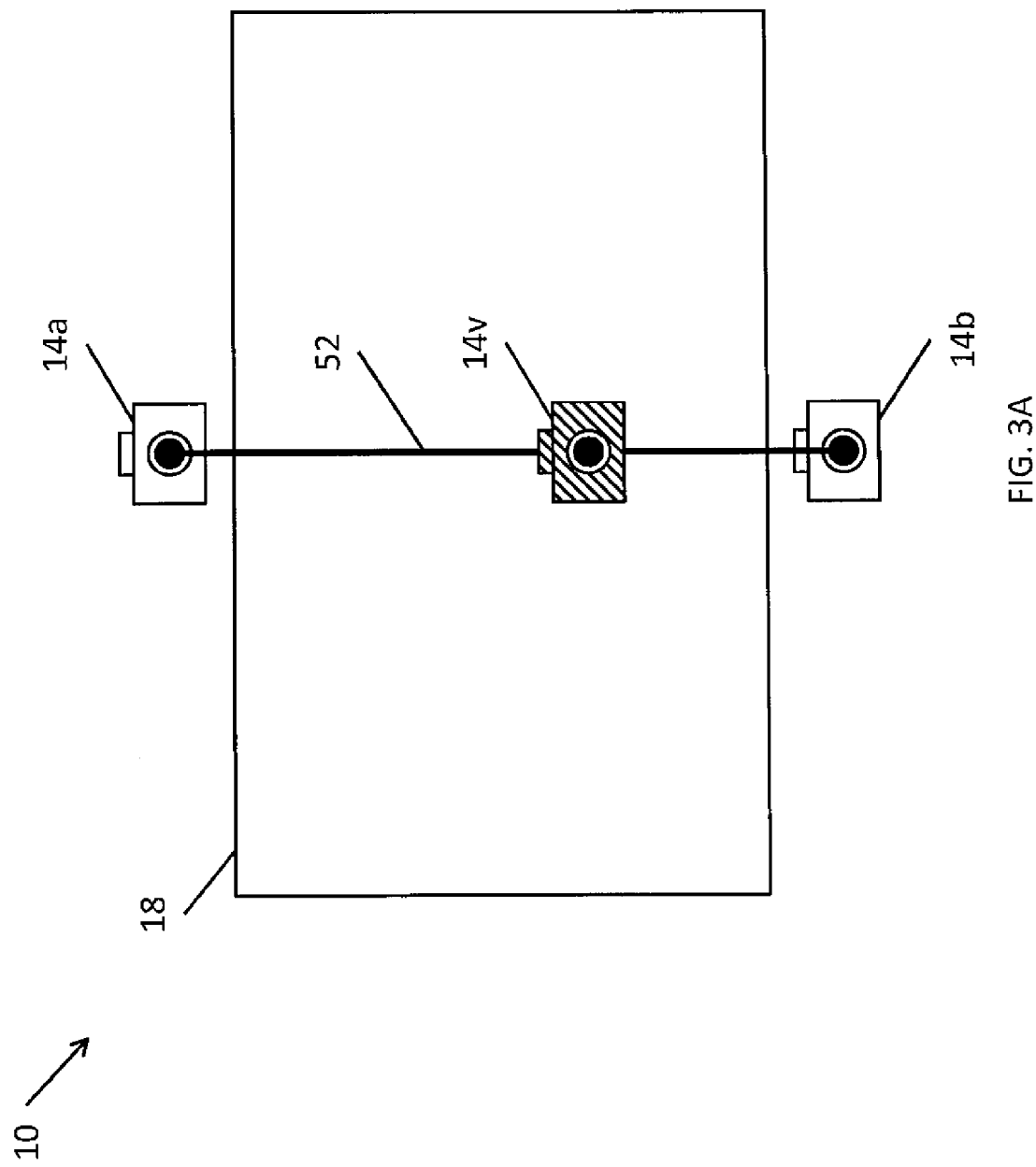
FIG. 3A is a schematic illustration of a virtual camera region according to one embodiment of the present invention.

FIG. 3A is a schematic illustration of a virtual camera region according to one embodiment of the present invention. As shown in FIG. 3A, in one embodiment of the present invention, a transmitting system 10 includes two cameras 14a and 14b. The raw images captured by cameras 14a and 14b can be combined to synthesize the view from the vantage point of a virtual camera 14v located along a line segment 52 extending between the cameras 14a and 14b. Techniques for performing view synthesis from multiple cameras are described, for example, in H.-Y. Shum, S.-C. Chan, S. B. Kang, "Image-Based Rendering", Springer, 2006 (hereinafter "Shum et al.") and D. Scharstein and R. Szeliski. A taxonomy and evaluation of dense two-frame stereo correspondence algorithms. *International Journal of Computer Vision*, 47(1/2/3):7-42, April-June 2002. (hereinafter "Scharstein et al."), the entire disclosures of which are incorporated herein by reference.

FIG. 3B is a schematic illustration of a virtual camera region according to one embodiment of the present invention. As shown in FIG. 3B, in one embodiment of the present invention, a transmitting system 10 includes three cameras 14a, 14b, and 14c. The raw images captured by cameras 14a, 14b, and 14c can be combined to synthesize the view from the vantage point of a virtual camera 14v within polygon or convex hull 54, where the cameras are located at corners or sides of the polygon (as shown in FIG. 3B, the polygon is a rectangle, but embodiments of the present invention are not limited thereto). In some embodiments, the virtual camera is located within a polygon or convex hull 56 where the cameras are located at the corners of the polygon (as shown in FIG. 3B, the polygon or convex hull is a triangle, but embodiments of the present invention are not limited thereto). In still other embodiments of the present invention, the vantage point of the virtual camera position may be placed outside of the polygon or convex hull, with the tradeoff that additional or more severe visual artifacts may be generated.

Figure 4A:
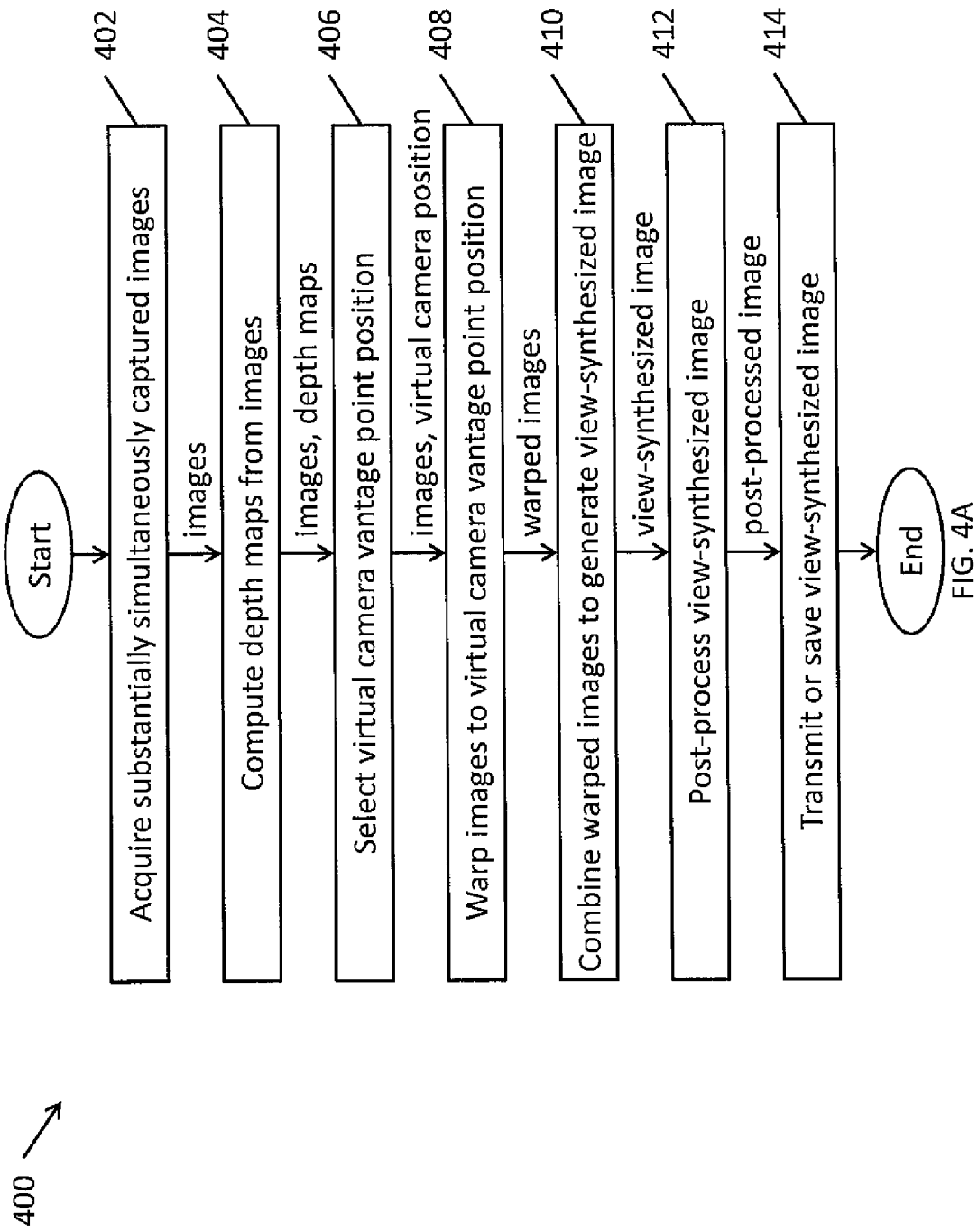
FIG. 4A is a flowchart illustrating a method for producing a view-synthesized image according to one embodiment of the present invention.

FIG. 4A is a flowchart illustrating a method for producing a view-synthesized image according to one embodiment of the present invention. As shown in FIG. 4A, in operation 402, raw images are acquired by the cameras. The image processor 12 receives the raw images from the cameras. These images may be, for example, images captured at substantially the same time by cameras 14. In some embodiments, in operation 404 a depth map is computed from the raw images to generate information about the depth of various pixels (e.g., the distance from the virtual camera to various pixels). This depth map can be computed using stereo or multi-view stereo techniques such as sparse stereo, dense stereo, semi-dense stereo, and billboards, as would be understood by one of skill in the art. The depth maps can optionally be refined using techniques such as color information and higher level image analysis such as face detection and/or silhouette detection with foreground/background segmentation techniques.

In operation 406, a virtual camera vantage point position is selected. This virtual camera vantage point may be received as a selected location or may be automatically determined. In one embodiment, the virtual camera vantage point may be determined automatically by determining a position on the display in which the other user is shown, based on, for example, the location of the video conferencing window within the user interface. Embodiments of the present invention may further automatically determine the location of a face within a window (or within a full screen display of a received video image) and may further automatically determine the location of a user's eyes or eye as shown on the display by applying a face detection algorithm, as would be understood by one of skill in the art. In other embodiments of the present invention, the virtual camera vantage point may be automatically determined by capturing one or more images of the transmitting subject 1, analyzing the position of the face of the transmitting subject to determine the eye gaze of the transmitting subject 1 (e.g., which part of the screen she is looking at) and placing the virtual camera vantage point position at that location.

In some embodiments of the present invention, instead of (or in addition to) calculating multiple depth maps independently of the virtual camera vantage point position as described above, a depth map from the perspective of the virtual camera position is calculated based on the raw images.

Once the virtual camera vantage point position is selected in operation 406, each of the images is warped in operation 408 to the virtual camera vantage point position as described, for example, in the above referenced Shum et al. paper. The warping process accounts for the three-dimensional geometry of the scene that is being imaged by the cameras in order to resolve disparate hypotheses for the appearance of each pixel in the resulting warped images. The warping process further takes into account the relative positions and orientations of the physical cameras, where these relative positions and orientations may be stored as parameters of the system and may be modified on a system-by-system basis (e.g., different transmitting systems may have the cameras spaced apart at different distances). Optionally, the warping process accounts for occlusions by applying, for example, z-buffering and scan-line techniques.

Figure 4B:
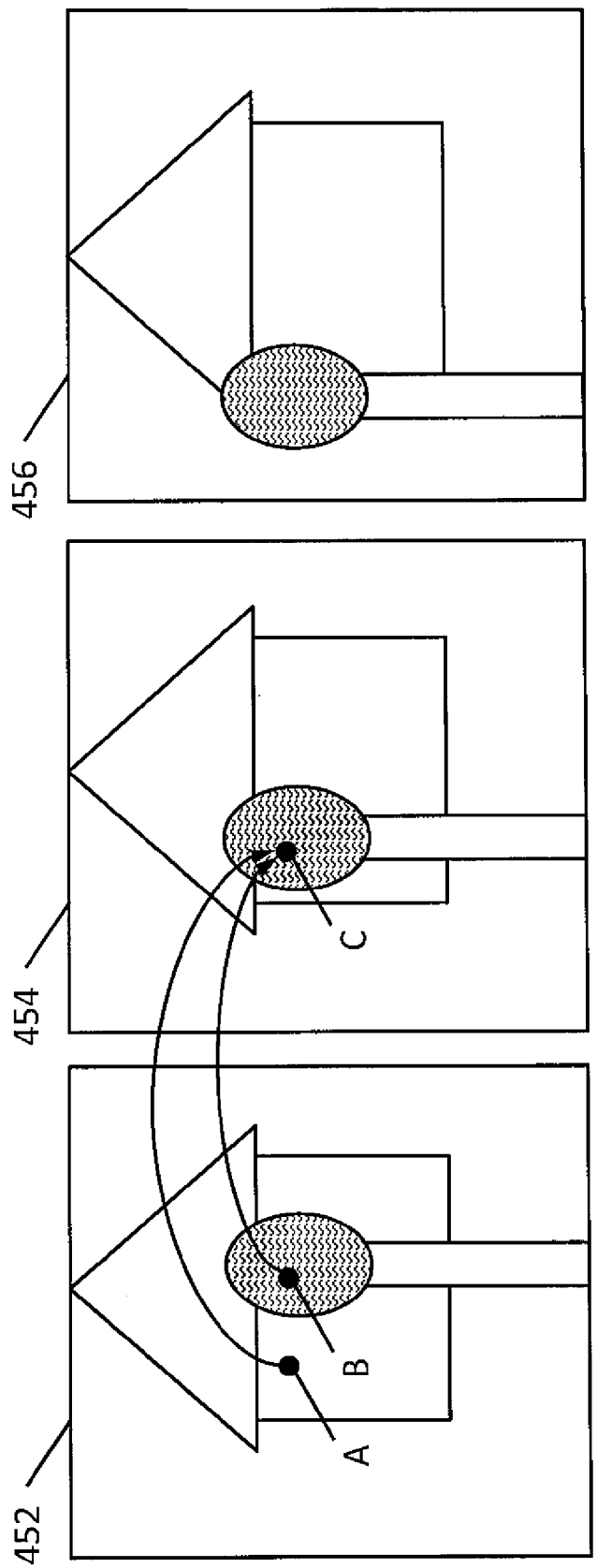
FIG. 4B is a schematic diagram illustrating a warping of images according to one embodiment of the present invention.

FIG. 4B is a schematic diagram of a warping of images according to one embodiment of the present invention. Referring to FIG. 4B, left and right raw images 452 and 456 are warped and combined to form a view synthesized image 454. According to one embodiment of the present invention, an ordered forward mapping technique is used to assign pixels to their new, warped positions in the correct sequence. For example, when mapping new viewpoints from the left raw image 452, the mapping order would be left-right and bottom-top. When considering a pixel in the left image, its corresponding pixel from the virtual camera between the left and right cameras will always be on the left with respect to the original position of the left image. The magnitude of the shift depends on the depth of the pixels (e.g., the disparity value obtained from a stereo analysis of the pixel. The shallower the depth of the pixel (the closer it is to the camera), the larger the left shift of the pixel.

Assume, for example, that pixels A and B of left image 452 map to the same pixel C of the warped image 454. If the warping is applied to the pixels from left to right, then pixel B (the pixel in the tree), after warping, would overwrite the earlier warping of pixel A to location C, leading to a correct virtual view. When warping the right image 456 to the warped image 454, a right-left ordering is used due to the right shift of the pixels.

Returning to FIG. 4A, in operation 410, the images are combined to generate a view-synthesized image, which is an image from a virtual camera 14v having a vantage point different from any one of the physical cameras 14 (e.g., different from the vantage point of any of physical cameras 14a, 14b, and 14c). The set of warped images provide various contributions to the pixels of the view-synthesized images. For example, the contributions can be computed by applying a weighted sum of the multiple contributing images. The weights can be computed on a per-pixel basis in accordance with the distances (depths) associated with the points. The weights can also be computed based on the output of segmentation, foreground/background segmentation techniques, or other higher-level analysis of the scene, as optionally performed during the computation of depth maps in operation 404.

In another embodiment of the present invention, instead of warping each of the images and combining the images in operations 408 and 410, a texture map of each image is computed and a composite image is reconstructed by applying the captured images as textures onto a three-dimensional model of the scene, as determined by the depth maps, in a manner similar to applying gift wrap to a box or decals to a plastic model.

Filters and other post-processing may be applied to the synthesized image in operation 412 to remove or hide visual artifacts or errors generated by the combining process and to add effects. For example, a median or blurring filter can be applied to the background (e.g., pixels having greater depth) to hide artifacts created in the background. In addition, the post-processed image can be updated or modified (e.g., changing color, focus, illumination, and content) or additional information in the form of stacked layers (or composited) can be added to the post-processed image to create more visual effects. In some embodiments, the composite view-synthesized image may also be further processed and converted into a 3D imaging format such as obj or Wavefront 3D object file format. In addition, the image may be compressed. One technique for compressing such image data is described in Zamarin, M., Milani, S., Zanuttigh, P., & Cortelazzo, G. M. (2010). A novel multi-view image coding scheme based on view-warping and 3D-DCT. Journal of Visual Communication and Image Representation, 21(5), 462-473 (hereinafter "Zamarin et al.") the entire disclosure of which is incorporated herein by reference.

The resulting view-synthesized image can then be transmitted to a receiving application or saved in operation 414. In a teleconferencing application, such as that illustrated in FIG. 1, the final image may be transmitted along with meta-data information for the preferred positions of the camera during viewing. However, embodiments of the present invention are not limited thereto and the various operations illustrated in FIG. 4A may be performed, as appropriate, by various components of the system, including the transmitting system 10, the receiving system 20, and the cloud processing system 40. For example, in one embodiment the view-synthesized image is transmitted; hence the elaboration (or rendering) is performed at the transmitting system 10 (or acquisition machine). In other embodiments, all of the acquired images are transmitted and the view-synthesis is performed at the receiving system 20 (or fruition machine). In addition, some operations, including the computing of depth maps in operation 404, automatic identification of virtual camera vantage point position in operation 406, warping of images in operation 408, combining the warped images in operation 410, and post-processing the view-synthesized image in 412 can be performed by the cloud processing system 40 prior to forwarding processed data on to receiving system 20 for further processing and/or display.

Figure 5:
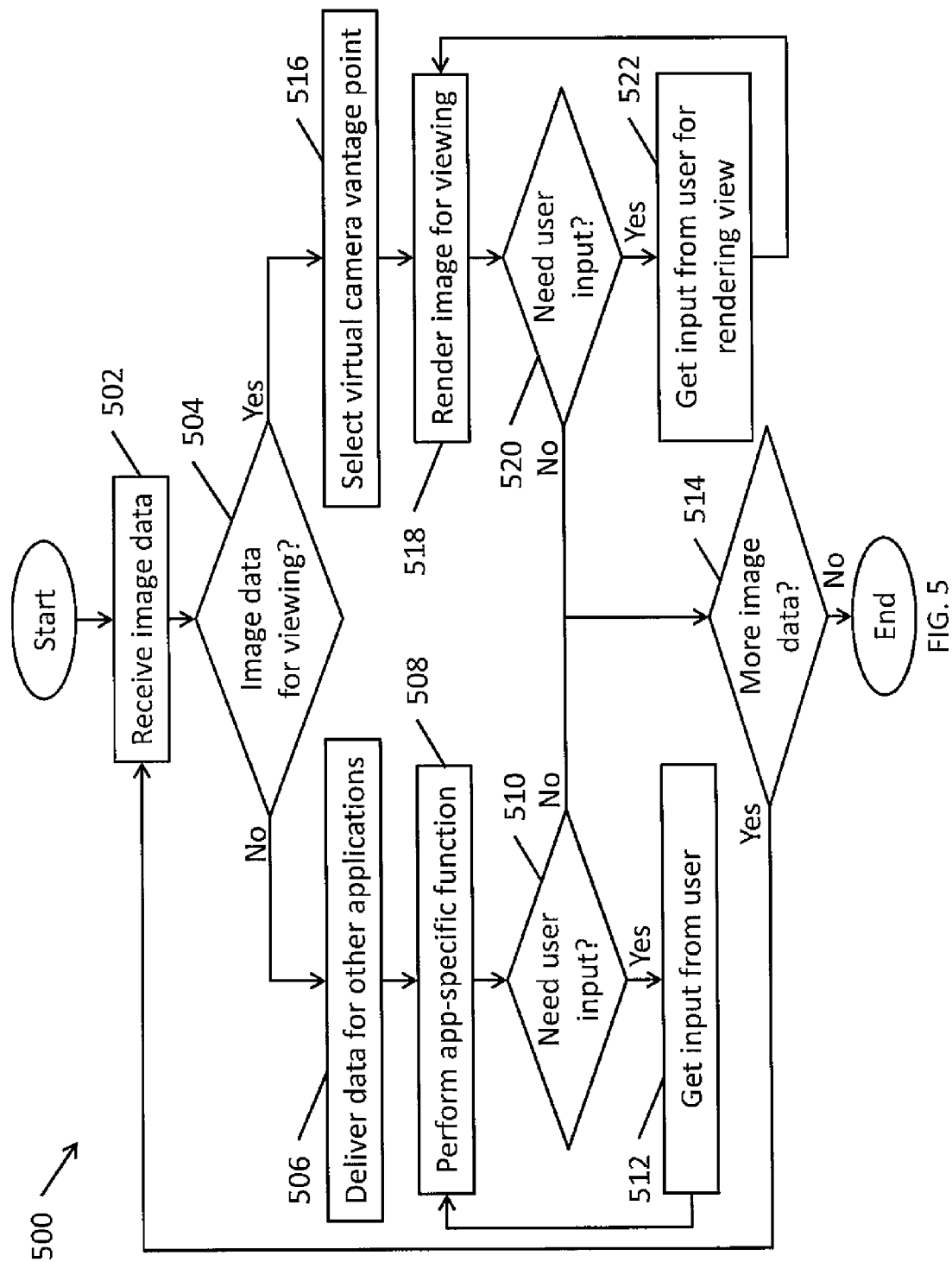
FIG. 5 is a flowchart illustrating a method for receiving processed image data and generating a view-synthesized image according to one embodiment of the present invention.

FIG. 5 is a flowchart illustrating a method for receiving processed image data and generating a view synthesized image according to one embodiment of the present invention. In operation 502, an image (or processed image data) is received. In operation 504, the receiving system 20 determines whether the received image data is for viewing. If not, then the image is delivered for use by other applications in operation 506. Application specific functions are performed by the receiving application in operation 508. For example, if the application is an Internet commerce application, the product price and other information may be shown along with the rendered imagery. If the application has a recognition algorithm, the image block may be passed to that algorithm for further processing. In operation 510, the receiving system 20 determines whether or not user input is needed. If it is, then in operation 512 input is accepted from a user (e.g., in the form of mouse, keyboard, touch, gesture, and other user input events) and the flow returns to operation 508 to perform additional application specific functions. If no user input is needed, then the receiving system 20 determines if more image data is needed in operation 514. If so, then more image data is received in operation 502 and if not, then the receiving process ends.

If the image data is determined in operation 504 to be for viewing, then a virtual camera vantage point is selected in operation 516. The virtual camera vantage point may be rendered based on a preferred vantage point as determined, for example, by automatically analyzing the image data. The virtual camera vantage point may also be selected by the receiver. In operation 518, the image data is rendered for viewing using, for example, the warping or depth map techniques as described above. (In some embodiments, the image data is already rendered by, for example, the transmitting system 10 and/or the cloud processing system 40 and therefore the image data can be displayed without significant additional processing by the receiving system 20.) In operation 520, the receiving system 20 determines whether or not user input is needed. If it is, then in operation 522 input is accepted from a user (e.g., in the form of mouse, keyboard, touch, gesture, and other user input events) and the flow returns to operation 518 to update the rendering. For example, the user input may result in selecting a new viewing vantage point, thereby requiring a new rendering to be performed or additional application specific functions to be performed. If no user input is needed, then the receiving system 20 determines if more image data is needed in operation 514. If so, then more image data is received in operation 502 and if not, then the receiving process ends.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, while aspects of embodiments of the present invention are described above in the context of video conferencing systems, embodiments of the present invention are not limited thereto and may be applied to interactions among many to many users such as in social networks, Internet commerce, news, and entertainment to provide additional more immersive user experiences. For example, embodiments of the present invention may be used to capture images of a speaker giving a public lecture to a live audience, where the system may track the speaker's gaze and synthesize a view in which the speaker appears to maintain eye contact with the camera over time.

What is claimed is:

1. A video transmitting system comprising:
 a display configured to display an image in a first direction;
 a plurality of cameras comprising:
  a first camera adjacent a first edge of the display;
  a second camera adjacent a second edge of the display; and
  a third camera adjacent the second edge of the display and spaced apart from the second camera, at least a portion of the display being proximal a convex hull that includes the first camera, the second camera, and the third camera, and the first camera, the second camera, and the third camera having at least partially overlapping fields of view encompassing the first direction; and an image processor configured to:
receive a position of a virtual camera relative to the cameras at least partially within the convex hull and at least partially on the display, the virtual camera having a field of view encompassing the first direction;
collect a plurality of raw images captured by the cameras at substantially the same time;
generate processed image data from the raw images for synthesizing a view in accordance with the position of the virtual camera by:
computing a depth map from the plurality of raw images;
generating a three-dimensional model from the depth map; and
applying the raw images as textures onto the three-dimensional model; and
transmit the three-dimensional model to a receiving system, the three-dimensional model comprising a plurality of vertices, each of the vertices having corresponding three-dimensional coordinates.

2. The video transmitting system of claim 1, wherein the image processor is configured to process the raw images by:
warping each of the raw images to the position of the virtual camera to generate a plurality of warped images; and
combining pixels of the warped images to generate the processed image data.

3. The video transmitting system of claim 1,
wherein the image processor is further configured to compute the depth map relative to the position of the virtual camera based on the plurality of raw images.

4. The video transmitting system of claim 1, wherein the image processor is further configured to apply a filter to the processed image data.

5. The video transmitting system of claim 1, wherein the position of the virtual camera is a location of the display in which a portion of an image of a face is displayed or is a computed location of an eye gaze.

6. The video transmitting system of claim 1, wherein the position of the virtual camera is a location of the display in which an eye of a face is displayed.

7. A method for generating a view-synthesized image in a video processing system, the video processing system comprising: a display configured to display an image in a first direction; a plurality of cameras comprising a first camera adjacent a first edge of the display, a second camera adjacent a second edge of the display, and a third camera adjacent the second edge of the display and spaced apart from the second camera, at least a portion of the display being proximal a convex hull that includes the first camera, the second camera, and the third camera, the first camera, the second camera, and the third camera having at least partially overlapping fields of view encompassing the first direction; and an image processor, the method comprising:
capturing a plurality of raw images by the cameras, the raw images being captured at substantially the same time;
receiving, by the image processor, a position of a virtual camera relative to the cameras at least partially within the convex hull and at least partially on the display, the virtual camera having a field of view encompassing the first direction;
generating, by the image processor, processed image data from the raw images for synthesizing a view in accordance with the position of the virtual camera by:
computing a depth map from the plurality of raw images;
generating a three-dimensional model from the depth map; and
applying the raw images as textures onto the three-dimensional model; and
transmitting the three-dimensional model to a receiving system, the three-dimensional model comprising a plurality of vertices, each of the vertices having corresponding three-dimensional coordinates.

8. The method of claim 7, wherein the generating the processed image data from the raw images in accordance with the position of the virtual camera comprises:
warping each of the raw images to the position of the virtual camera to generate a plurality of warped images; and
combining pixels of the warped images to generate the processed image data.

9. The method of claim 7, further comprising:
computing the depth map relative to the position of the virtual camera based on the plurality of raw images.

10. The method of claim 7, further comprising applying a filter to the processed image data.

11. The method of claim 7, wherein the position of the virtual camera is a location of the display in which a portion of an image of a face is displayed or is a computed location of an eye gaze.

12. A video processing system configured to receive a three-dimensional model from a video transmitting system, the video transmitting system comprising a plurality of cameras and a display, the video processing system comprising:
an image processor configured to:
receive the three-dimensional model from the video transmitting system, the three-dimensional model comprising a plurality of vertices, each of the vertices having corresponding three-dimensional coordinates;
receive a position of a virtual camera from a video receiver system comprising a display, wherein the position of the virtual camera corresponds to a position within a convex hull of the video transmitting system, the convex hull including a first camera, a second camera, and a third camera, of the plurality of cameras, with each of the first, second, and third camera being adjacent to the display of the video transmitting system and having overlapping fields of view; and
generate a synthesized view from the three-dimensional model and the position of the virtual camera.

13. The video processing system of claim 12, wherein the three-dimensional model is generated from processed image data, wherein the processed image data comprises a plurality of raw images captured at substantially the same timed.

14. The video processing system of claim 13, wherein the video processing system is a server configured to receive the three-dimensional model from the video transmitting system over a network, and
wherein the video processing system is configured to synthesize a view from the vantage point of the virtual camera from the three-dimensional model and to transmit the synthesized view to the video receiver system over the network.

15. The video processing system of claim 12, wherein the video processing system comprises the video receiver system, and wherein the image processor is further configured to synthesize a view from the vantage point of the virtual camera from the three-dimensional model and to display the synthesized view on the display.

* * * * *